United States Patent [19]

Agnoff

[11] Patent Number: 5,086,903
[45] Date of Patent: Feb. 11, 1992

[54] TANDEM BRAKE ROLLER SYSTEM

[75] Inventor: Charles Agnoff, Wilmington, N.C.

[73] Assignee: Interrolll Holding AG, San Antonino, Switzerland

[21] Appl. No.: 682,580

[22] Filed: Apr. 8, 1991

[51] Int. Cl.⁵ .............................................. B65G 13/00
[52] U.S. Cl. ................................. 193/35 A; 193/35 B
[58] Field of Search ................ 193/35 A, 35 SS, 35 B

[56] References Cited

U.S. PATENT DOCUMENTS

| | | | |
|---|---|---|---|
| 3,312,320 | 4/1967 | Froio | 193/35 A |
| 3,724,642 | 4/1973 | De Good | 193/35 A |
| 3,871,501 | 3/1975 | Kornylak | 193/35 A |
| 3,918,561 | 11/1975 | Isacsson | 193/35 A |
| 4,000,796 | 1/1977 | Bolton et al. | 193/35 A |
| 4,119,190 | 10/1978 | Kornylak | 193/35 A |

Primary Examiner—Joseph E. Valenza
Attorney, Agent, or Firm—Collard, Roe & Galgano

[57] ABSTRACT

A tandem braking system for use in gravity conveyors to control the speed of loaded pallets traveliing thereon, especially pallets which have non-continuous support surfaces or support surfaces which are aligned perpendicular to the direction of travel. A brake roller is mounted below the conveyor support plane. Two floating rollers with pliable surfaces are rotatably mounted above the brake roller and rise above the conveyor support plane. Engagement of the tandem brake roller causes downward movement and compression of the floating rollers and causes a braking force to be exerted on the pallet base.

10 Claims, 6 Drawing Sheets

TANDEM BRAKE ROLLER SYSTEM

BACKGROUND OF THE INVENTION

1. Field of the Invention

This invention relates to a tandem brake roller system which prevents loads traversing the same from travelling over the conveyor too rapidly. More particularly, the invention relates to a braking system in which a series of tandem brakes apply a braking force to the bottom surface of the load.

2. Description of the Prior Art

Brake rollers are frequently employed in conveyor systems to control the speed of conveyed goods. In general, these devices utilize a special brake roller inserted among the plurality of rollers on the gravity conveyor. These rollers produce a braking force and control the maximum rate of advance of the load being conveyed down the gravity roller conveyor. These retarding rollers often were liquid filled as shown in U.S. Pat. Nos. 2,618,370 to Orwin, 3,511,350 to Stein, 2,607,459 to Ludwig et al. and 3,399,752 to Orwin. Non-liquid filled braking devices such as that shown in U.S. Pat. No. 3,655,021 to Froio, U.S. Pat. No. 3,918,561 to Isacsson and U.S. Pat. No. 4,275,572, to Holmes et al., have also been utilized.

Certain designs employ rotating brake rollers having internally fitted centrifugal weights which afford the desired braking action. These brakes are normally mounted in fixed position and directly contact the bottom surface of the conveyed goods.

Occasionally they are mounted with springs or other floating devices to provide traction or to accommodate surface irregularities of the conveyed goods. However, with a flexible mount there is only a single contact point when engaging the bottom surface. Another known method is to mount the braking roller indirectly, underneath one or two free rotating rollers which have axles firmly attached to the conveyor. Although this may provide two contact points, they are not flexible and do not accommodate surface irregularities.

One of the difficulties encountered in utilizing any of these prior art braking devices is that a braking action is developed only when the bottom surface of a load engages the braking roller. Frequently, load support bases are used, for example, pallets. A common type of pallet used in conveyor systems is the GMA (Grocery Manufacturers Association) pallet which has several bottom boards which run perpendicular to the direction of travel. When a conventional brake is used to control the speed of such pallets, it is mounted, either rigidly or by springs. As braking action is only achieved when the brake contacts the pallet bottom boards, there is a tendency for runaway conditions to occur due to the large spaces between the bottom boards.

When such a non-continuous surface moves across a braking roller, a braking action is applied only for the time of engagement between the roller engaging surface on the support surface and the braking roller. If the roller engagement support surfaces, for example, on a wooden pallet, is an eight inch wide board, braking action is developed only for the time during which the eight inch width of the board engages the braking roller. If the next board acting as a roller engagement support surface is spaced, for example, a foot or more behind the initial roller engagement support surface, then no braking action occurs until the second engagement surface again engages the braking roller. Additionally, an eight inch board which is uneven or damaged will have an engagement surface of less than eight inches, and even possibly may be so warped as to provide no engagement surface at all.

The net result of using such a system with the above described pallets is that the speed of the palletized load or packages travelling over the gravity roller conveyor is not properly controlled. This results in damage to the loads being transported or to the gravity roller conveyor itself. While it is possible to increase the number of braking rollers utilized in a given conveyor system this solution has been found to be very costly and complex. An example of this is disclosed in Newman, U.S. Pat. No. 4,383,598, which involved many brake units. However, this patent requires mechanical or electronic sensors and electronic circuitry which activates pneumatic cylinders.

Other prior art devices utilize a conveyor belt and a motor to provide retarding torque. In addition to consuming energy, these arrangements are complex and require frequent care.

SUMMARY OF THE INVENTION

Accordingly, it is an object of the present invention to provide a braking system for a longitudinally extending gravity roller conveyor for slowing the movement of a load travelling thereon.

It is a further object of the invention to provide a braking system for a longitudinally extending gravity roller conveyor which can control the rate of descent of a wide variety of load base configurations.

It is yet another object of the present invention to provide a braking system for a longitudinally extending gravity roller conveyor which is low cost and simple in design.

It is still another object of the present invention to provide a braking system with two flexible contact points.

These and other related objects are achieved by a tandem braking system for controlling the speed of loads conveyed by gravity along a roller conveyor which includes a gravity-type roller conveyer and a tandem brake assembly. The gravity-type roller conveyor includes at least one longitudinally-extending support rail and a plurality of longitudinally-spaced apart rollers rotatably mounted on the support rail and arranged generally in a row, the rollers each having a top circumferential surface defining a tangential point of contact which cooperatively define a support surface plane for a load to be conveyed therealong. The tandem brake assembly includes support means for mounting the brake assembly on the support rail generally between two adjacent rollers and a braking roller rotatably mounted in a fixed position on the support means generally beneath the support surface plane. A pair of spaced-apart, freely rotatable traction rollers are mounted on the support means in a generally vertically-displaceable manner so as to be disposed generally above and in rotatable engagement with the braking roller so that said braking roller may exert a braking force thereon. The traction rollers are also disposed so as to be generally aligned with the conveyor rollers and so as to normally extend slightly above the support surface plane in a non-loaded state, the traction rollers being compressible when transversed by a load being conveyed.

Preferably, the support means has a pair of spaced-apart plates demountably attached to the support rail between which the braking roller is supported. Most advantageously, each of the plates has a vertically-extending slot formed thereon and the traction rollers have a pair of oppositely extending axles which engage the slots of the plates. Each of the axles are capable of vertical displacement independently of the opposite axle, whereby the traction roller can be offset relative to the support surface plane.

Most desirably, the traction rollers are composed of a soft elastomeric or rubber tire which provides high friction and good contact with the load being conveyed. The deflection of this material provides a yielding action which accommodates a wide range of pallet surfaces. They are preferably mounted over a centrifugal brake roller which is fixed in position relative to the conveyor.

Thus, when a load reaches a tandem braking unit, it is highly likely to engage the rollers even if the surface is damaged, warped or uneven. Furthermore, as there are now two different contact points several inches apart at each braking location, contact time with the pallet is virtually doubled, affording more control and reducing or eliminating the possibility of a runaway condition.

The braking roller may be designed so that the force produced thereby is in direct proportion to the speed of the load. Thus, as the load speed increases the retarding force produced by the brake also increases. The design of the floating traction rollers is particularly important where the support surface of a load is damaged or has non-continuous roller engaging surfaces which would create a problem on conventional systems using braking rollers. It has been difficult in the past to control the speed of such pallets because they have such a small surface area extending in the longitudinal direction. The invention utilizes more available surface area because of the type and placement of the floating rollers. Also, conventional systems do not operate well with mixed loads as they ar tuned to handle only one weight class.

These and other objects and advantages of the present invention will become apparent from the following description of the accompanying drawings, which disclose one embodiment of the invention. It is to be understood that the drawings are to be used for purposes of illustration only, and not as a definition of the invention.

BRIEF DESCRIPTION OF THE DRAWINGS

In the drawings, wherein similar reference numerals denote similar elements throughout the several views.

DESCRIPTION OF THE PREFERRED EMBODIMENT

Figure 1:
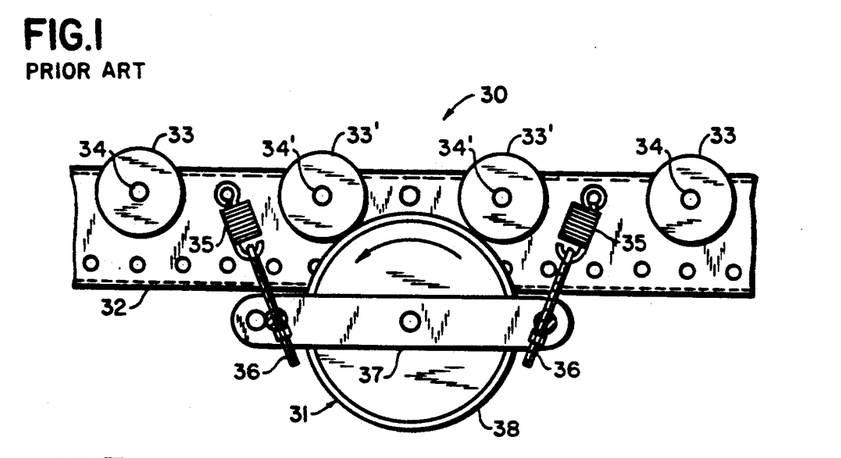
FIG. 1 is a side elevational view of a braking device according to the prior art.

Referring now to the drawings, and in particular to FIG. 1, there is shown a gravity roller conveyor 30 equipped with a conventional brake roller system, generally designated by reference numeral 31. Gravity roller conveyor 30 has a support member or rail 32 on which rollers 33 are mounted via axles 34. Support member 32 can be one or more sections and extends the entire length of the conveyor. Support member 32 may be installed with a slightly downward angle. As a result, material which is placed onto the conveyor's loading end, rolls to the discharge end, due to the force of gravity and the slight downward incline.

As can be appreciated, since gravity is employed as drive means, the roller conveyor is non-powered. It is therefore desireable to also provide non-powered braking devices.

Braking system 31 consists of two position-fixed but freely rotatable rollers 33' which are aligned with the other rollers 33 of conveyor 30. Rollers 33' each have an axle 34' which is fixed with respect to gravity roller conveyor 30. Centrifugal brake roller 38 is mounted between and below two rollers 33', in spring-loaded manner via springs 35 and manually adjustable rods 36 so as to bias the centrifugal roller 38 in a frictionally abutting manner against the two central rollers 33'.

This arrangement requires adjustment for different weight ranges. If a greater braking force is desired, a mounting bar 37 would be put under greater tension, i.e., tightening adjusting means 36 would increase the force exerted by spring 35 urging mounting bar 37 toward rollers 33'.

Specific disadvantages arises from merely attaching centrifugal brake roller 38 to a pair of rollers 33'. As can be appreciated from the drawing, all rollers 33, 33' are identical and lie in a single plane of conveyor 30. At a predetermined distance, for example twice the distance of a load support u surface, a brake 38 is attached to two rollers 33'. This arrangement cannot provide compensation for uneven load support surfaces. Only a load support surface that is at the plane of rollers 33' can experience a braking force. Since the conveyor may have several support members disposed parallel to each other, it is possible that support member 32, in which the brake is installed, provides little or no support for the load if it is sufficiently supported by the other support members.

In addition, since rollers 33' are typically metal, they have a low frictional surface. This results in a "cushioned" braking effort, i.e., rollers 33' experiences some initial slippage between the moving load and the rollers.

As can be appreciated, this is an inconvenient system. Additionally, it would not be practical to use such a conveyor for transporting mixed loads, i.e., alternating loads of different weights.

Figure 2:
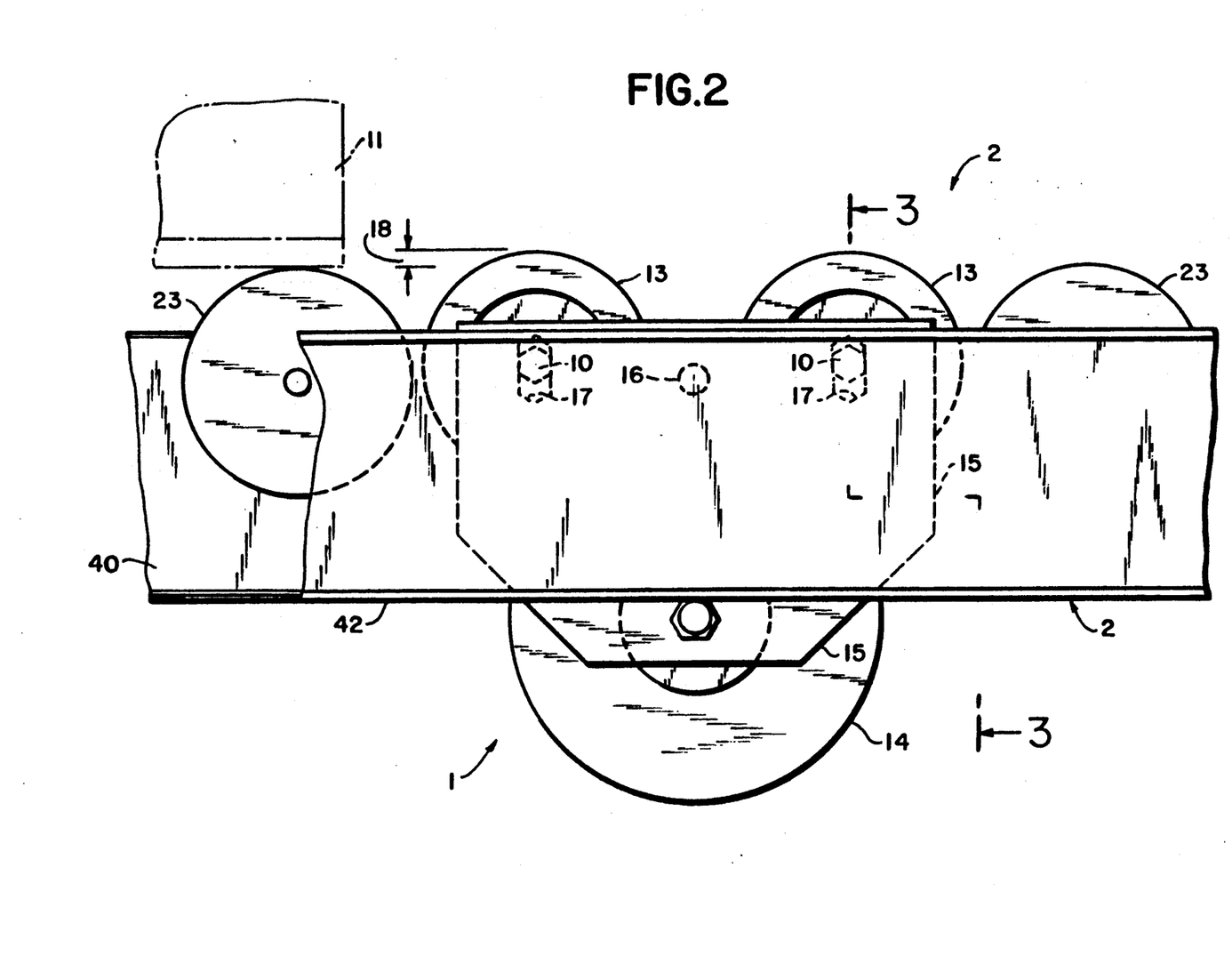
FIG. 2 is a side elevational view of the brake system embodying the present invention.

Referring now to FIG. 2, there is shown a tandem braking system embodying the present invention generally designated as 1 installed on a similar roller conveyor 2. Tandem braking system 1 consists of two types of rollers, a pair of floating rollers 13 and a brake roller 14. Each floating roller 13 is equipped with a pliable or resilient surface, e.g., rubber, as opposed to other conveyor rollers 23 which are, for example, metal. Braking system 1 is mounted on support members or rails 40, 42.

Floating roller 13 rotates on an axle 10 which allows for unhindered rotation. Axle 10 advantageously has ball bearings which can clearly be seen from the drawing (see FIG. 3) and may be lubricated or unlubricated. The flexible surface of roller 13 also operates as a spring to urge roller 13 upwards, against brake roller 14, to its offset position.

Brake roller 14 is a centrifugal weight brake of a known type and is mounted below the conveyor support plane. For example, conveyor brake roller disclosed in U.S. Pat. No. 3,918,561 (the subject matter of which is incorporated herein by reference thereto) can be utilized in the configuration suggested by the invention.

Floating rollers 13 and brake roller 14 are fastened together as a single unit by a pair of plates 15, which may be attached to rail 42 by a single fastener 16 (only shown in FIG. 2) to allow for quick and easy removal of the entire unit. While plates 15 and brake roller 14 are fixed with respect to conveyor 2, floating rollers 13 are rotatably mounted on shafts or spindles, slidably mounted with respect to plates 15 within vertical groove 17.

Floating rollers 13 rest solely under their own weight against brake roller 14 and when not in use, rise above conveyor 2 an amount designated by offset 18. This is the maximum offset that floating rollers 13 will achieve. Offset 18 is designed to ensure that a load is engaged by floating rollers 13, regardless of the configuration of its base. Offset 18, for example, is set at 0.25 inches.

Figure 3:
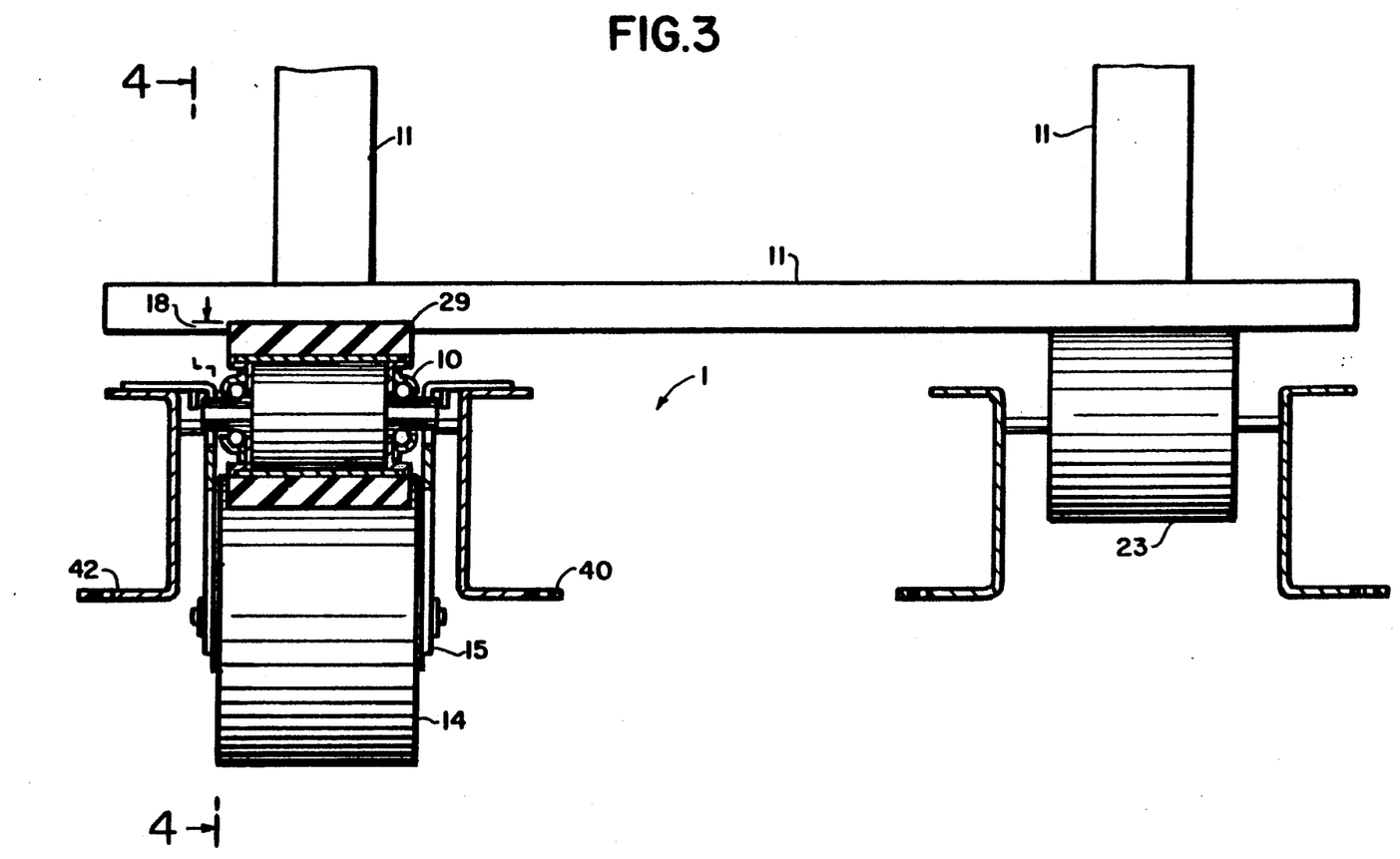
FIG. 3 is a sectional view in part elevation taken along line 3—3 of FIG. 2.

Referring now to FIG. 3, it can be seen that floating roller 13 is equipped with a tire 29 which is a soft elastomeric or rubber tire which provides high friction and good contact with the load being conveyed due in part to its wider foot print when deformed. Pallet 11 is shown supported by two sets of rollers 23, each set may include support members or rails 40, 42. The number of rails which are provided depends on the size and weight of loads to be transported. Also, any number of tandem braking systems 1 can be provided for each of the rails.

Figure 4:
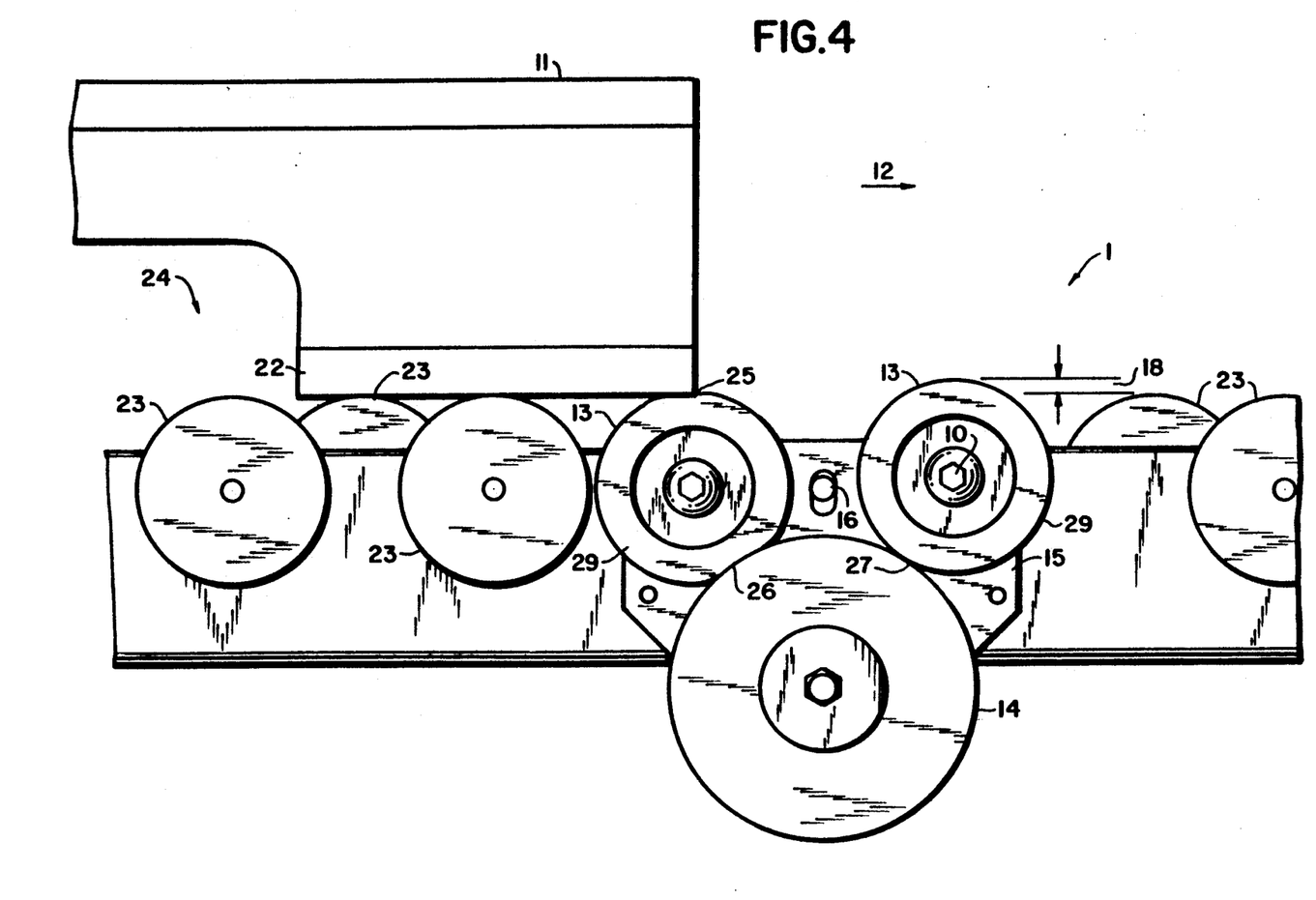
FIG. 4 is a sectional view taken along line 4—4 of FIG. 3.

FIG. 4 shows a pallet 11 travelling in a direction 12. Pallet 11 has engaged floating roller 13 with support board 22 which is viewed on end, i.e., support board 22 runs perpendicular to the direction of travel 12. As a result, there is not continuous support of pallet 11 over its length evidenced by aperture 24 which is just behind support board 22. Thus, the brief contact pallet 11 will have with the braking system 1 is highly critical.

Since floating rollers 13 rotate unhindered, any braking force imparted to pallet 11 is done so by braking roller 14 through floating rollers 13. Pallet 11 has engaged floating roller 13 which is rearward in braking system 1 in the direction of travel 12. Since floating roller 1 extends beyond the plane of conveyor 2 by offset 18, three things occur as a result of pallet 11 arriving at tandem braking system 1, for example. First, the floating roller 13 is deformed slightly at the point of contact 25 with pallet 11. Secondly, floating roller 13 with axle 10 are pushed downward in groove 17. Thirdly, since floating roller 13 is now closer to braking roller 14, which is fixed with respect to conveyor 2, floating roller 13 deforms slightly at contact point 26.

The deformation of floating roller 13 at contact points 26 and 27 insures highly frictional contact with pallet 11. This contact insures that a good braking force will be exerted on support board 22, regardless of its condition. In addition, when pallet 11 advances to engage forward floating roller 13, so that both floating rollers 13 are engaged, contact time with pallet 11 is virtually doubled affording more control and reducing or eliminating the possibility of a runaway condition.

Note that floating roller 13 which is forward in braking system 1, in the direction of travel 12, operates independently of the other floating roller. As a result, even though the rearward roller is engaged, the forward roller is still in the rest position identified by its rise above conveyor 2 by offset 18, the position of its axle in groove 17 (shown in FIG. 2) and its undeformed condition at contact point 27 with braking roller 4.

Figure 5:
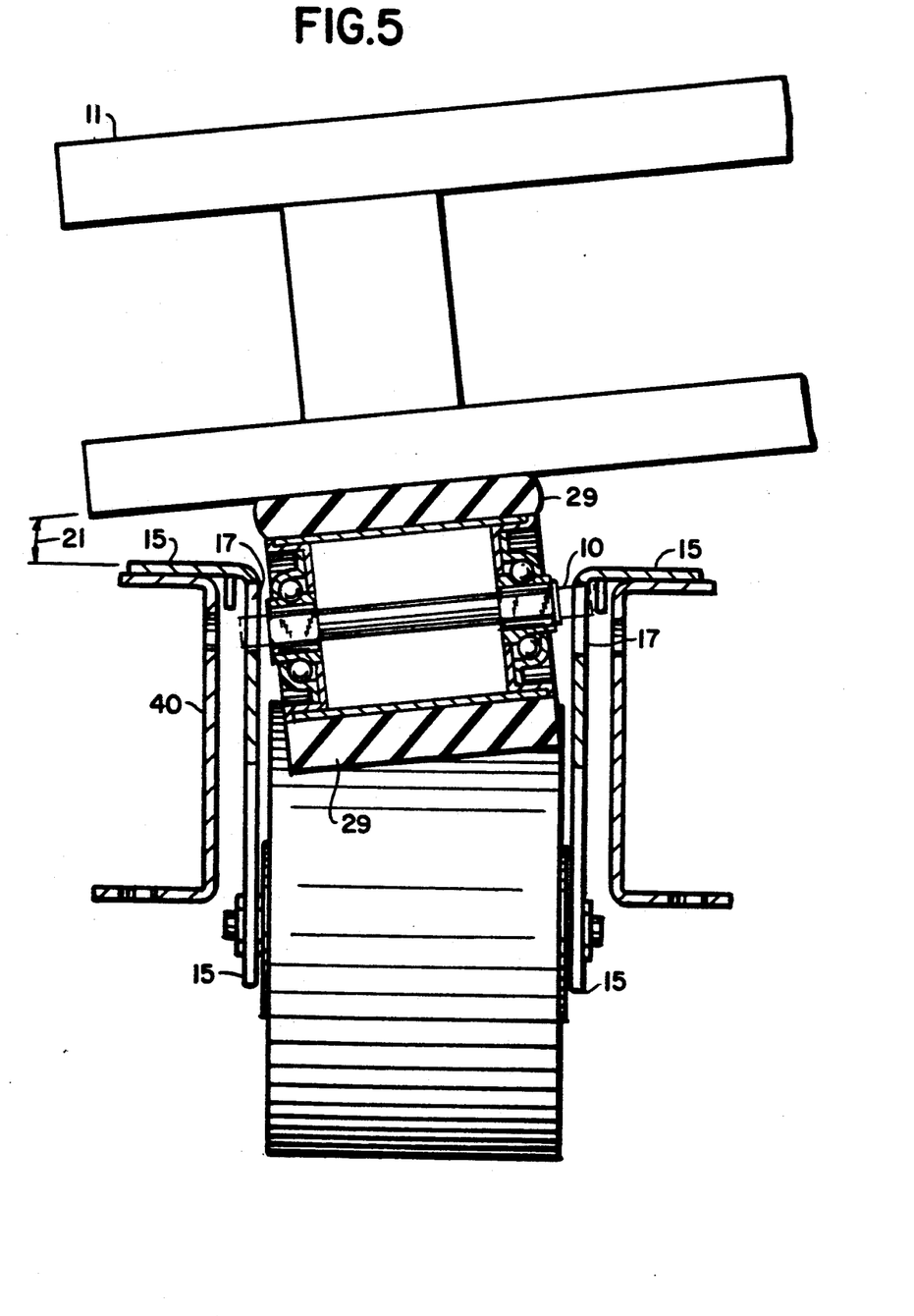
FIG. 5 is a sectional view, in part elevation, showing the traction roller pivoting under uneven loading.

Each roller 13 possesses one other degree of freedom in its operation. As can be seen in FIG. 5, each end of axle 10 can move downwardly within groove 17 independently of the other end. A load which traverses the conveyor at an angle 21 with respect to the plane of the conveyor, can be engaged by the entire roller surface, shown as tire 29. A system which lacked the ability to conform to angle 21 would only engage the load in a small area where it was nearest the plane of the conveyor.

Figure 6:
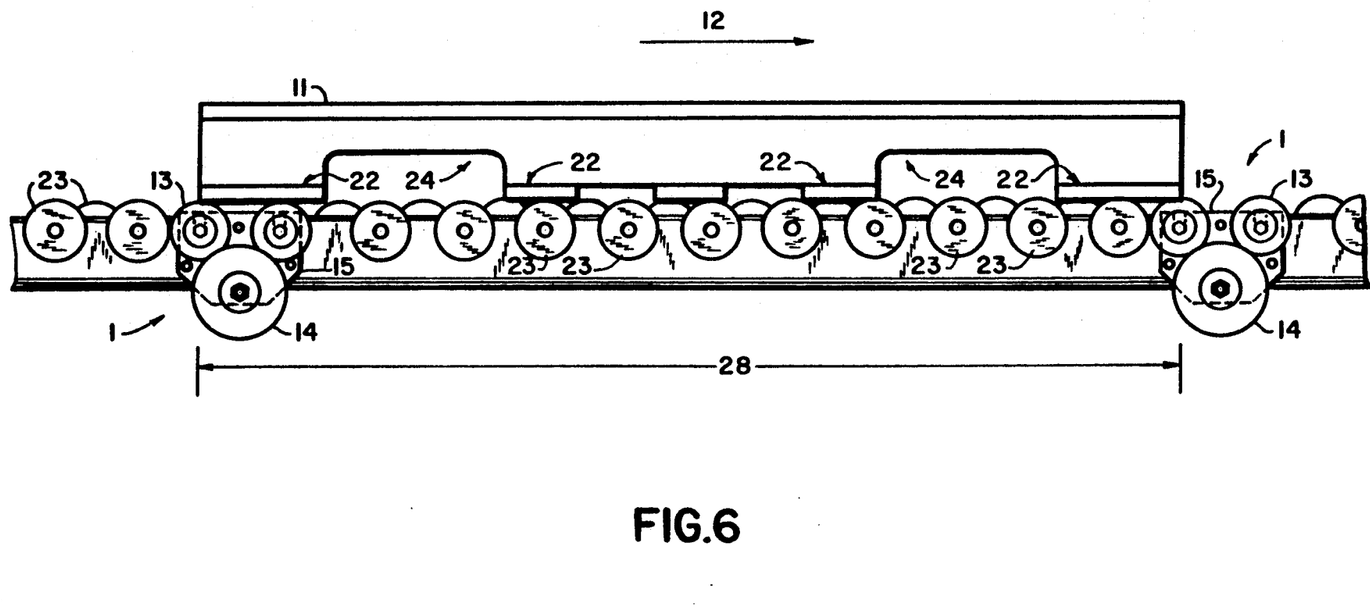
FIG. 6 is a side elevational view showing the utilization of several braking devices along the conveyor.

Referring now to FIG. 6, conveyor 2 is shown with two tandem braking systems 1 ideally placed one pallet distance 28 apart. With such a configuration, the forward edge of pallet 11, travelling in direction 12, contacts tandem braking system 1, in the forward direction of travel 12, while the rear edge of pallet 11 is still engaged with tandem braking system 1 in the rearward direction of travel 12. In this manner, pallet 11 is subject to the next braking force before being released by the prior tandem braking system 1.

Figure 7A:
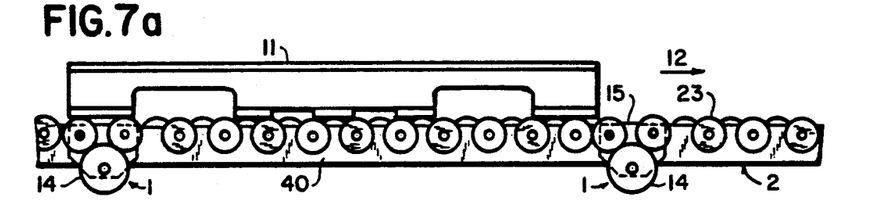
FIG. 7a–7d are a series of side elevational views of the braking device-equipped conveyor sequentially depicting the braked movement of a pallet therealong.
Figure 7B:
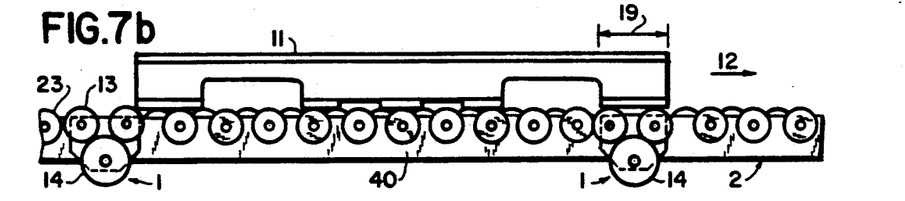
Figure 7C:
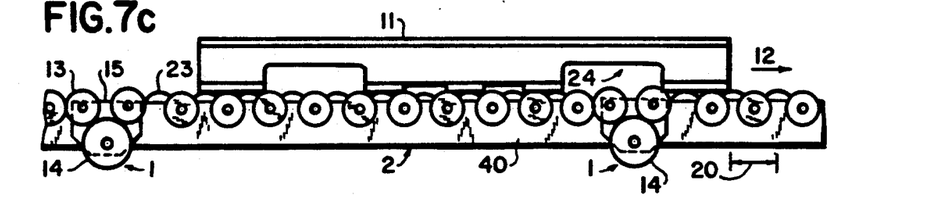
Figure 7D:
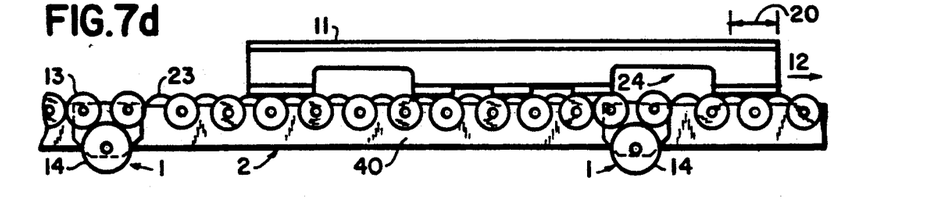

Referring to FIGS. 7a-7d, a series of views show the interaction of two braking roller systems. In FIGS. 7a-7b, pallet 11 is subject to a braking force by two sets of tandem braking systems 1 during the length of travel 19.

The only remaining free run pallet 11 will encounter is when braking system 1 is positioned at aperture 24. Since tandem braking system 1 has a significant contact distance in the direction of travel 12, due to the existence of two rollers, the length of free run of pallet 11 is reduced to length of travel 20 relating to FIGS. 7(c) and 7(d). For example, in the case of a Grocery Manufacturers Association pallet, length of travel 20 would be approximately 5 inches.

Accordingly, while only one embodiment of the present invention has been shown and described, it is obvious that many changes and modifications may be made thereunto without departing from the spirit and scope of the invention.

What is claimed is:

1. A tandem braking system for controlling the speed of loads conveyed by gravity along a roller conveyor, comprising:
   (a) a gravity-type roller conveyor including at least one longitudinally-extending support rail and a plurality of longitudinally-spaced apart rollers rotatably mounted on said support rail and arranged generally in a row, said rollers each having a top circircumferential surface defining a tangential point of contact which cooperatively define a support surface plane for a load to be conveyed therealong; and
   (b) a tandem brake assembly including:
      (i) support means for mounting said brake assembly on said support rail generally between two adjacent rollers, (ii) a braking roller rotatably mounted in a fixed position on said support means generally beneath said support surface plane, and (iii) a pair of spaced-apart, freely rotatable traction rollers mounted on said support means in a generally vertically-displaceable manner so as to be disposed generally above and in rotatable engagement with said braking roller so that said braking roller may exert a braking force thereon, said traction rollers also being disposed so as to be generally aligned with said conveyor rollers and so as to normally extend slightly above said support surface plane in a non-loaded state, said traction rollers being compressible when transversed by a load being conveyed.

2. The tandem braking system as claimed in claim 1, wherein said support means comprises a pair of spaced-apart plates demountably attached to said support rail between which said braking roller and said traction rollers ar supported.

3. The tandem braking system as claimed in claim 2, wherein each of said plates has a vertically-extending slot formed thereon and wherein said traction rollers have a pair of oppositely extending axles which engage said slots of said plates, each of said axles being capable of vertical displacement independently of said opposite axle, whereby said traction roller can be offset relative to said support surface plane.

4. The tandem braking system as claimed in claim 1, wherein said compressible traction rollers have a circumferentially-extending pliable surface composed of a soft elastomeric tire.

5. The tandem braking system as claimed in claim 1, wherein said compressible traction rollers have a circumferentially-extending pliable surface composed of a rubber tire.

6. The tandem braking system as claimed in claim 1, wherein said braking roller is a centrifugal braking roller.

7. The tandem braking system as claimed in claim 6, wherein said centrifugal braking roller has a braking force which varies in direct proportion to the intended speed of said loaded pallet along said support surface plane.

8. The tandem braking system as claimed in claim 1, wherein at least two of said tandem brake assemblies are provided and are spaced a predetermined distance apart along said conveyor.

9. The tandem braking system as claimed in claim 7, wherein said tandem brake assemblies are placed one pallet length apart along said conveyor.

10. The tandem braking system as claimed in claim 9, wherein said tandem brake assemblies are placed one pallet length apart along said conveyor whereby the load can simultaneously engage said two tandem brake assemblies.

* * * * *